(No Model.)
J. L. DOWNING.
HAND TRUCK.
No. 284,619. Patented Sept. 11, 1883.
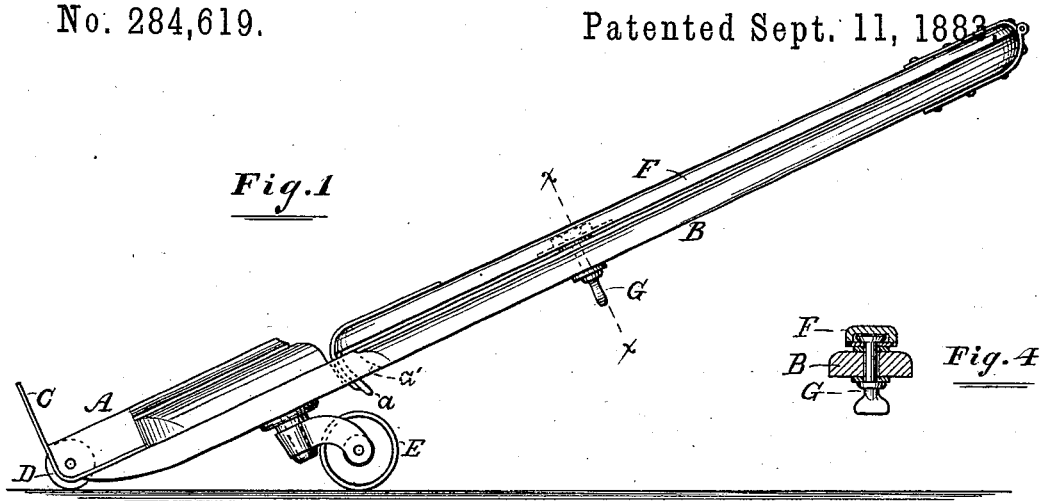
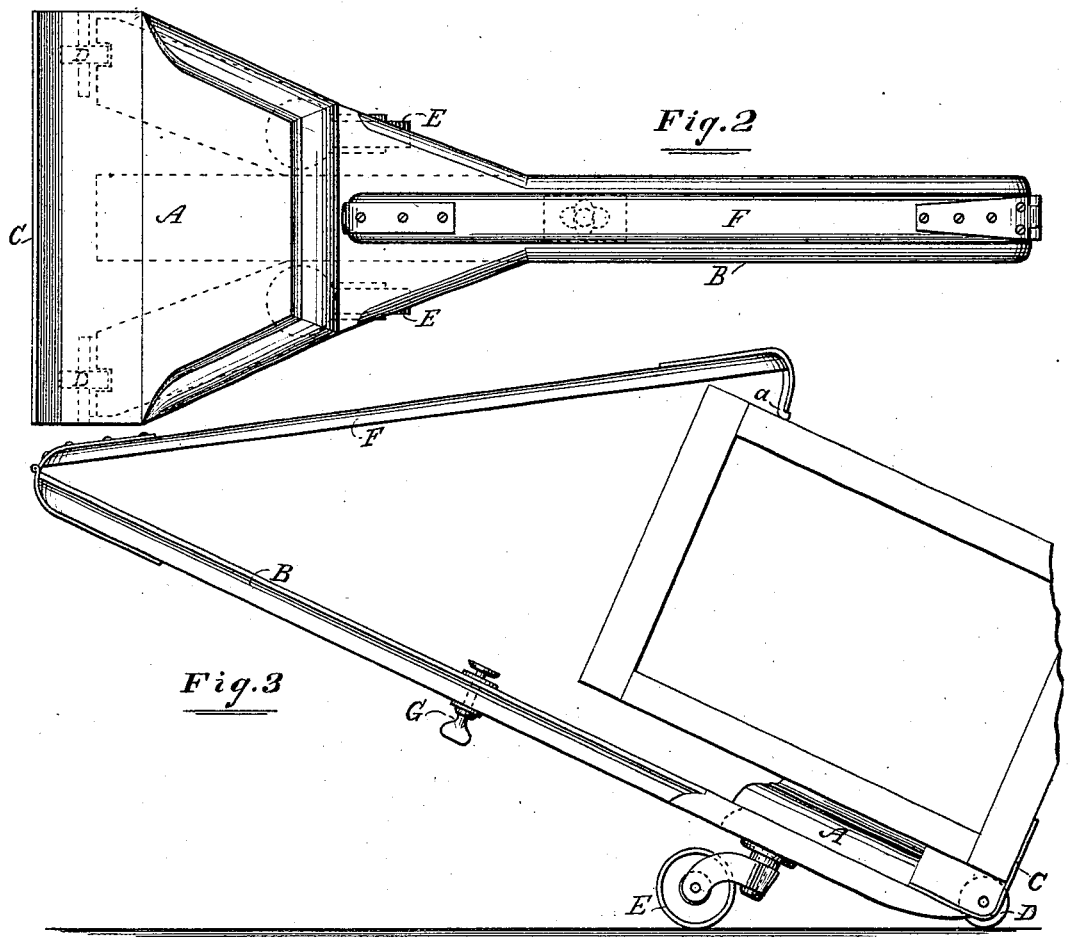
Witnesses:
J. B. Halpenny
B. J. Morse
Inventor:
James L. Downing
per F. F. Warner
his Attorney.
N. PETERS, Photo-Lithographer, Washington, D. C.

UNITED STATES PATENT OFFICE.

JAMES L. DOWNING, OF RICHMOND, ILLINOIS.

HAND-TRUCK.

SPECIFICATION forming part of Letters Patent No. 284,619, dated September 11, 1883.

Application filed April 21, 1883. (No model.)

*To all whom it may concern:*

Be it known that I, JAMES L. DOWNING, of Richmond, in the county of McHenry and State of Illinois, have invented certain new and useful Improvements in Hand-Trucks, of which the following, in connection with the accompanying drawings, is a specification.

In the drawings, Figure 1 is a side view of a truck embodying my improvements. Fig. 2 is a top or plan view thereof. Fig. 3 is a side view, showing the truck when carrying a heavy load; and Fig. 4 is a section on the plane of the line $x\ x$.

Like letters of reference indicate like parts.

My invention relates to that class of trucks intended for the purpose of moving furniture, boxes, burial-caskets, and both light and heavy goods over comparatively short distances, and propelled by hand, all of which will hereinafter be more fully described.

A represents the platform of the truck, and B is a lever or handle extending therefrom.

C is an upturned flange or lip on the front edge of the platform A.

D D are small rollers or wheels, located at the front end or lower corner of the platform A. These rollers or wheels are arranged, as shown, to ride upon the floor when the lever or handle, B, is inclined, so as to be grasped with facility near its end by the hand of the operator or workman.

E E are large rollers or casters, applied to the under side of the rear part of the platform A. These casters are pivoted or swivel-jointed to their stems, and are of such size or diameter as to support the truck at the proper inclination.

F is a bar or arm, jointed or hinged at its upper end to the upper end of the handle or lever B, so that its forward end may be raised or swung vertically. The forward end of the arm F is hook-shaped, as shown, and I deem it preferable to apply a tongue of leather, $a$, or other soft or flexible material to the hooked end of the arm F, for the purpose hereinafter referred to.

G is a pivoted latch or catch, turning in the handle B and in a slot or recess in the arm F, for the purpose of temporarily locking the said arm down upon the handle when there is no occasion for using the said arm. The rear part of the platform A is slotted, as indicated at $a'$, to receive the hook of the arm F when the latter is not in use.

To use this truck for the purposes for which it is intended, I roll it up to the article to be loaded upon it, tilt back the article slightly, and tilt up the truck and slide the flange C underneath the article, and then tilt the article over upon the truck and lower the handle, thereby depositing the article upon the truck, and arranging the latter in proper position for being propelled with its load. When the article is comparatively light, but too heavy to be carried far by hand with facility, it may be deposited by hand upon the truck, and then conveyed to its destination by means of the truck. When the article is very heavy, I proceed as described, but, in addition, release the arm F and arrange its hooked end over the farther corner of the box or article to be moved, so that when the truck-handle is lowered the arm F will aid in tilting or depositing the box upon the truck. When the article to be moved is finely finished, the soft tongue $a$ will prevent it from being injured by the hook referred to.

By employing two sets of wheels, one pair of which is larger in diameter than the others, as shown, the truck is not only supported in an inclined position, but I am also enabled to push the truck with facility over obstacles, such as the threshold of a door or other impediments, simply by lowering the handle, thus raising the forward or small wheels over the obstacle and throwing the weight of the load upon the large wheels. The truck, as will be perceived, may be impelled upon either or both sets of wheels, and the large wheels will ride over ordinary obstacles, or may be raised over them by throwing the load upon the front wheels. In moving large or long boxes and heavy goods, it will be best to throw the load upon the large wheels or casters by dropping the handle to or nearly to a horizontal position; but in moving light furniture the load may be supported on the small wheels only. The load may be dumped or discharged in the usual manner.

Having thus described my invention, what

I claim as new, and desire to secure by Letters Patent, is—

1. The combination, in a hand-truck, of the small rollers D D, arranged at the front end of the truck, the large swiveled wheels E E, arranged underneath the rear part of the truck-platform, the handle B, the hinged hook-shaped arm F, and the catch G, the arm or lever B being adapted to receive the hook of the arm F, substantially as and for the purposes specified.

2. The combination, with the handle of a truck, of the hinged hook F, provided on its hooked end with a soft tongue or cushion, a, substantially as and for the purposes specified.

JAMES L. DOWNING.

Witnesses:
 JOHN WEST,
 G. W. ELDRIDGE.